United States Patent
Ellis et al.

(10) Patent No.: US 7,478,102 B2
(45) Date of Patent: Jan. 13, 2009

(54) MAPPING OF A FILE SYSTEM MODEL TO A DATABASE OBJECT

(75) Inventors: Nigel R. Ellis, Redmond, WA (US); Gregory S. Friedman, Redmond, WA (US); Bekim Demiroski, Redmond, WA (US); Anil Kumar Nori, Redmond, WA (US); Amit Shukla, Redmond, WA (US); Srinivasmurthy P. Acharya, Sammamish, WA (US); Jeffrey T. Pearce, Sammamish, WA (US); Michael J. Newman, Redmond, WA (US); Jason T. Hunter, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 377 days.

(21) Appl. No.: 11/091,079

(22) Filed: Mar. 28, 2005

(65) Prior Publication Data

US 2006/0215448 A1 Sep. 28, 2006

(51) Int. Cl.
*G06F 17/00* (2006.01)
(52) U.S. Cl. .................................... 707/100; 707/102
(58) Field of Classification Search ................ 707/1, 707/100
See application file for complete search history.

(56) References Cited

U.S. PATENT DOCUMENTS 7,127,474 B2 * 10/2006 Williamson et al. ..... 707/103 R
2002/0053020 A1 * 5/2002 Teijido et al. ............... 713/153
2002/0169858 A1 * 11/2002 Bellinger et al. ............ 709/220
2003/0212705 A1 * 11/2003 Williamson et al. ..... 707/103 R
2005/0223047 A1 * 10/2005 Shah et al. .................. 707/201

FOREIGN PATENT DOCUMENTS

WO WO 03/030031 A2 * 4/2003

OTHER PUBLICATIONS

Gordon, Andrew. "Typing a Multi-Language Intermediate Code." Mar. 2001, Proceedings of the 28th ACM SIGPLAN-SIGACT symposium, pp. 248-260.*

* cited by examiner

*Primary Examiner*—John R. Cottingham
*Assistant Examiner*—Alexandria Y Bromell
(74) *Attorney, Agent, or Firm*—Amin, Turocy & Calvin, LLP

(57) ABSTRACT

The subject invention provides a system and/or a method that facilitates mapping a data base model to a database object. A type storage system can utilize a storage mapping of a file storage data model. The mapping can describe the database object created based at least in part upon a schema and how instances of the type described in the schema are stored and/or accessed. Furthermore, a query can be provided to find at least one of an item, a document, and/or a contact that satisfy at least one criterion. The type storage system can receive data, wherein the data is at least one of a schema, a data model, a type, a query, and query criteria via an interface to provide the storing and querying. Additionally, the type storage system can generate a view that exposes at least one instance of the type.

14 Claims, 12 Drawing Sheets

MAPPING OF A FILE SYSTEM MODEL TO A DATABASE OBJECT

TECHNICAL FIELD

The present invention generally relates to databases, and more particularly to systems and/or methods that facilitate storing a type instance and/or querying data.

BACKGROUND OF THE INVENTION

Advances in computer technology (e.g., microprocessor speed, memory capacity, data transfer bandwidth, software functionality, and the like) have generally contributed to increased computer application in various industries. Ever more powerful server systems, which are often configured as an array of servers, are commonly provided to service requests originating from external sources such as the World Wide Web, for example.

As the amount of available electronic data grows, it becomes more important to store such data in a manageable manner that facilitates user friendly and quick data searches and retrieval. Today, a common approach is to store electronic data in one or more databases. In general, a typical database can be referred to as an organized collection of information with data structured such that a computer program can quickly search and select desired pieces of data, for example. Commonly, data within a database is organized via one or more tables. Such tables can be arranged with rows and columns.

The tables can comprise one or more records, wherein a record can include a set of fields. Records are commonly indexed as rows within a table, and the record fields are typically indexed as columns, such that a row/column pair of indices can reference a particular datum within a table. For example, a row may store a complete data record relating to a sales transaction, a person, or a project. Likewise, columns of the table can define discrete portions of the rows that have the same general data format, wherein the columns can define fields of the records.

Each individual piece of data, standing alone, is generally not very informative. Database applications make data more useful because they help users organize and process the data. The database application allows the user to compare, sort, order, merge, separate and interconnect the data, so that useful information can be generated from the data. Yet, the capacity and versatility of databases have grown to an incredible amount to allow a virtually endless storage capacity utilizing databases. Moreover, typical database systems offer limited query-ability based upon time, file extension, location, and size. For example, in order to search the vast amounts of data associated to a database, a typical search is limited to a file name, a file size, a date of creation, wherein such techniques are deficient and inept.

With a continuing and increasing creation of data from end-users, the problems and difficulties surrounding finding, relating, and storing such data is reaching its peak. End-users write documents, store photos, rip music from compact discs, receive email, retain copies of sent email, etc. For example, in the simple process of creating a music compact disc, the end-user can create megabytes of data. Ripping the music from the compact disc, converting the file to a suitable format, creating a jewel case cover, designing a compact disc label, all require the creation of data.

Not only are the complications surrounding users, developers have similar issues with data. Developers create and write myriad of applications varying from personal applications to highly developed enterprise applications. While creating and/or developing, developers frequently, if not always, gather data. While obtaining such data, the data needs to be stored. In other words, the problems and difficulties surrounding finding, relating, and storing data affect both the developer and the end user. In view of the above, there is a need to improve upon and/or provide systems and/or methods that mitigate deficiencies associated with conventional systems and databases.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to systems and/or methods that facilitate mapping of a data model to a database object. A type storage system can provide storing of a type instance and/or querying. The storing of the type can describe the database object and how instances of types are stored and/or accessed. The querying can find at least one of an item, a document, and a contact that each satisfies a certain criteria. Moreover, the type storage system can utilize an interface to receive data, wherein the data can include a schema, a type, a criteria, a query criteria, etc.

In accordance with one aspect of the subject invention, the type storage system can include a store component that stores at least one type instance. The storage can be a mapping of the data model, wherein the data model can represent a file storage system. Furthermore, the type storage system can also include a query component. The query component can provide at least one query in the file storage system data model to satisfy a criterion. In accordance with another aspect of the subject invention, the type storage system can include a relational component that can utilize a relational storage and/or a relational query capability. The relational component can invoke a database engine to provide such relational techniques, wherein these techniques can facilitate storing the type instance and/or querying.

Moreover, the type storage system can further include a view component that can provide a view that exposes all instances of a given type. The type can be a hierarchical structure and/or an inheritance structure. The view can be related to a particular type that projects a subset of the types with a base type. In other aspects of the subject invention, methods are provided that facilitate mapping of a data model to a database object.

The following description and the annexed drawings set forth in detail certain illustrative aspects of the invention. These aspects are indicative, however, of but a few of the various ways in which the principles of the invention may be employed and the subject invention is intended to include all such aspects and their equivalents. Other advantages and novel features of the invention will become apparent from the following detailed description of the invention when considered in conjunction with the drawings.

DESCRIPTION OF THE INVENTION

Figure 1:
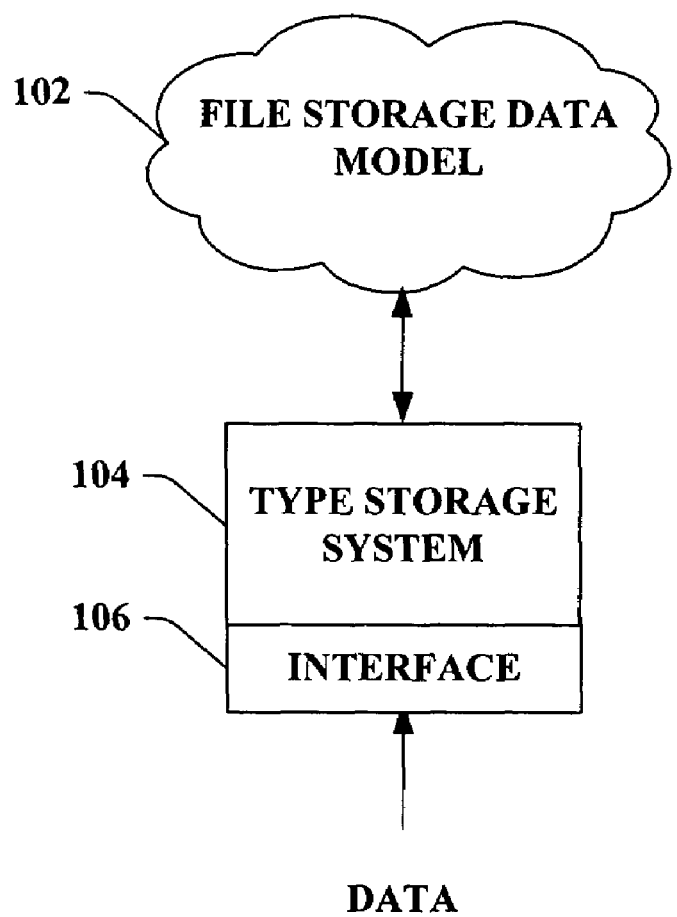
FIG. 1 illustrates a block diagram of an exemplary system that facilitates storing a type instance associated with a data model.

As utilized in this application, terms "component," "system," "interface," "schema," and the like are intended to refer to a computer-related entity, as a combination of hardware and soft-ware (e.g., in execution), perhaps with a combination of firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The subject invention is described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

Now turning to the figures, FIG. 1 illustrates a system 100 that facilitates storing a type instance associated with a data model. The data model can be a file storage data model 102 that enables storing, finding, and relating information. For example, an information type can be, but is not limited to, a document, an image, a video, a contact, a message, an email, an audio clip, etc. The informational types can be considered units of information, which can be represented as instances of complex types that are part of a type system that supports inheritance. Inheritance can be defined as a situation in which certain characteristics are passed on from one context to another. In particular to object-oriented programming, objects inherit attributes and/or behaviors from other objects.

It is to be appreciated that inheritance can be considered a hierarchical structure and/or format.

A type storage system 104 can store the type instance and query to efficiently and effectively find at least one of items, documents, and/or contacts. The type storage system 104 can receive data, wherein the data can include a type, a criteria, a schema, a query criteria, . . . . Specifically, storing the type instance that relates to an informational type (e.g., a document, an image, a video, a contact, a message, an email, an audio clip) can provide at least one of the following: 1) find at least one item in the file storage data model 102 that satisfy a certain criteria; 2) find at least one document in the file storage data model 102 that satisfy a particular criteria; and 3) find at least one contact (e.g., including an individual, organization, and group) that satisfy a certain criteria.

The type storage system 104 can utilize a relational database technique associated to a relational storage and a relational query. It is to be appreciated that such capabilities can be provided by a database engine (not shown). The relational database techniques can be associated to relational databases, wherein a relational database is a collection of data items organized as a set of formally-described tables. The data within the tables can be accessed and/or reassembled in various ways without the requirement of reorganizing the database tables. Furthermore, the relational database can be easily extended, such as adding new categories without modifications to existing applications and/or data. It is to be appreciated that the subject invention is not limited to relational databases and/or associated techniques and that any suitable technique can be utilized.

The system 100 further includes an interface component 106, which provides various adapters, connectors, channels, communication paths, etc. to integrate the type storage system 104 into virtually any operating system. In addition, the interface component 106 can provide various adapters, connectors, channels, communication paths, etc. that provide for interaction with data and the type storage system 104. It is to be appreciated that although the interface component 106 is incorporated into the type storage system 104, such implementation is not so limited. For instance, the interface component 106 can be a stand-alone component to receive or transmit the data in relation to the system 100.

Figure 2:
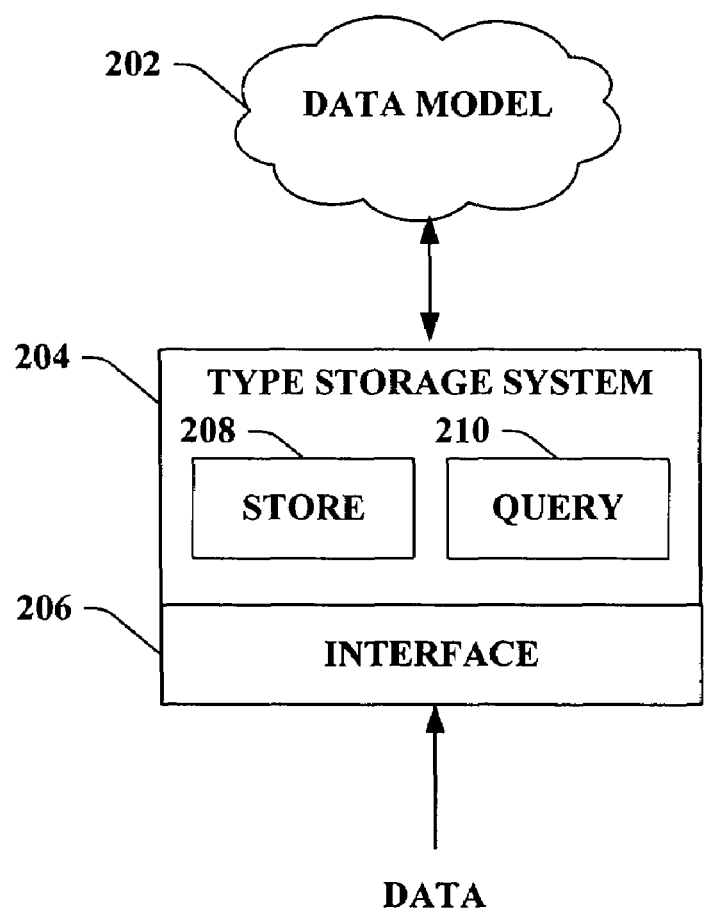
FIG. 2 illustrates a block diagram of an exemplary system that facilitates storing a type instance and/or querying to find at least one of an item, a document, and a contact.

FIG. 2 illustrates a system 200 that facilitates storing a type instance and/or querying to find an item, a document, and a contact associated to a data model 202. The data model 202 can be a model representation of a file storage system that utilizes a hierarchical characteristic and/or inheritance. The type can include a document, an image, a video, a contact, a message, an email, an audio clip, etc. However, it is to be appreciated that a type can be a typical information type stored in a system represented by the data model 202. A type storage system 204 can store the type instance and provide querying that can efficiently find at least one of the following: an item in the data model 202, a document in the data model 202, and a contact in the data model 202. The type storage system 204 can receive data, wherein the data can be a query criteria, a schema, a criteria, a schema definition, a data model, a type, . . . . The system 200 can further employ an interface 206 to facilitate providing various adapters, connectors, channels, communication paths, etc. to integrate the type storage system 204 into virtually any operating system and facilitate communication.

The type storage system 204 can further include a store component 208 ("store 208") that can store the type instances. The storage can be a mapping of the data model 202, wherein the storage mapping can describe the database object that is created based on a schema definition and how instances of types described in the schema are stored and/or accessed. In other words, the store 208 can store the instances of the type and at least one rule associated to mapping a type declaration into the database object.

The type storage system 204 can include a query component 210 ("query 210") that provides a querying of data. The query 210 can obtain at least one of the following: an item in the system represented by data model 202; a document in the system represented by data model 202; and a contact (e.g., including an individual, an organization, and a group) in the system represented by the data model 202. It is to be appreciated and understood that the query can be based at least upon a certain criteria and/or query criteria obtained via the interface 206. Furthermore, the query 210 is not so limited to the item, document, and contact, and any suitable information type stored in the system represented by the data model 202 can be utilized.

Figure 3:
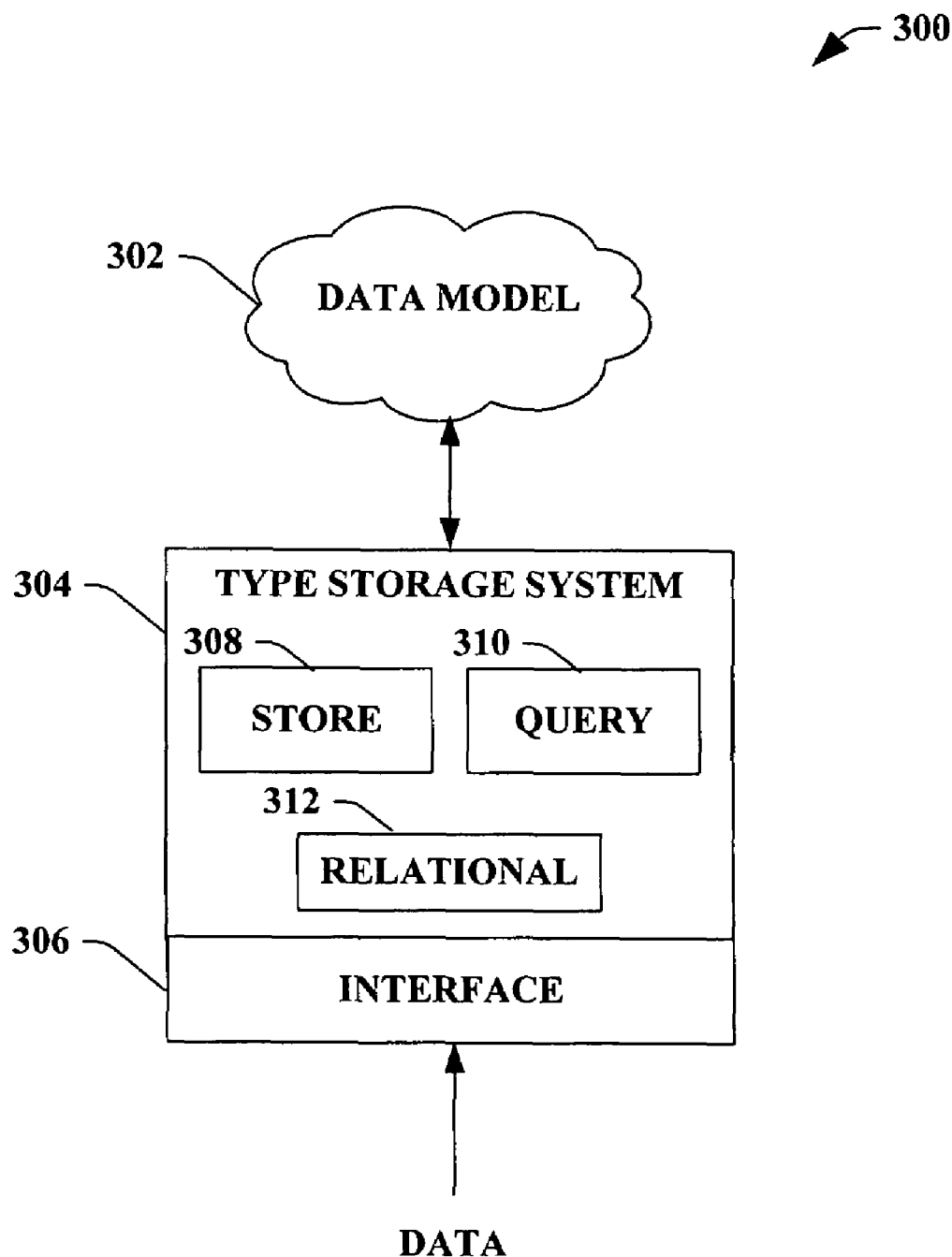
FIG. 3 illustrates a block diagram of an exemplary system that facilitates utilizing a relational storage and/or relational query capabilities.

FIG. 3 illustrates a system 300 that facilitates utilizing a relational storage and relational query capabilities. A type storage system 304 can store a type instance and query to efficiently and effectively find items, documents, and contacts, wherein such elements are associated to a file system represented by a data model 302. It is to be appreciated that the file system can be a storage file system that utilizes a hierarchical structure and/or an inheritance characteristic. The type storage system 304 can be substantially similar to the type storage system 104, 204, as depicted in FIGS. 1 and 2 respectively. The type storage system 304 can invoke an interface 306 to facilitate communication and/or receiving data to be further utilized in accordance with the subject invention.

The type storage system 304 can include a store component 308 (store 308) and a query component 310 ("query 310"). The store 308 can provide any suitable storing technique to store the type instance. The query 310 can provide a query that can efficiently and effectively obtain at least one of the following: at least one item in a system that meets a criteria; at least one document in a system that satisfies a criteria; and at least one contact that meets a criteria. It is to be appreciated and understood that the store 308 and the query 310 can be substantially similar to the store 208, and the query 210 as depicted in FIG. 2.

The type storage system 304 can further include a relational component 312 ("relational 312"). The relational 312 utilizes database techniques (e.g., utilizing a database engine) to build a relational storage and/or provide a relational query capability to facilitate storing type instances and/or querying. The relational 312 can incorporate techniques associated to a relational database, wherein the relational database is a collection of data items organized as a set of formally-described tables as described in detail above. It is to be appreciated that the subject invention is not limited to relational database and associated techniques and that any suitable technique can be utilized.

Figure 4:
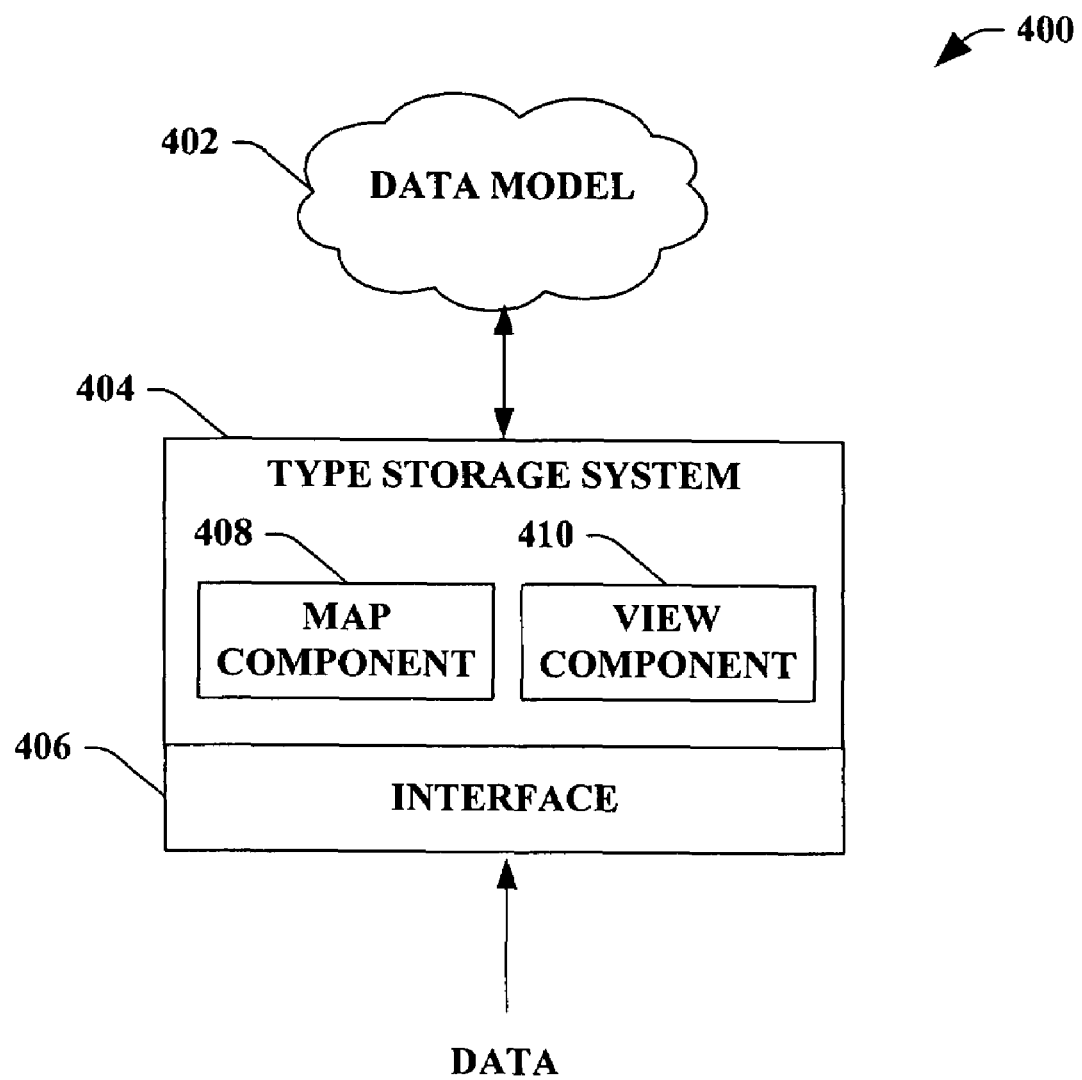
FIG. 4 illustrates a block diagram of an exemplary system that facilitates mapping and/or viewing in conjunction with a type storage system.

FIG. 4 illustrates a system 400 that facilitates mapping and/or viewing in conjunction with a data model 402. The data model 402 can represent a file storage system that enables storing, finding, and relating information. A typical information type that can be stored in the system can include a document, an image, music, a video, a contact, a message, etc. The information type can be represented as instances of complex types that are part of a type system that supports inheritance. A type storage system 404 can store the type instances and provide a query to find items, documents, and contacts that satisfy a certain criteria. The system 400 can further employ an interface 406 to facilitate communication and/or receiving data that can include criteria, types, schemas, models, and query criteria.

The type storage system 404 can further include a map component 408 to facilitate storing the type instance. The map component 408 provides mapping of types described in a schema to defined types and database objects. The map component 408 can be a storage mapping that describes at least one database object, wherein the database object can be created based on a schema definition and/or how instances of types described in the schema are stored and/or accessed. In other words, the instances of types can be stored and rules can be utilized to map a type declaration into the database object. Each type in the schema maps to a class (e.g., common language runtime (CLR)) in a storage.

The type storage system 404 can include a view component 410 to provide a view projection. The view projection can expose instances of the type that is viewed. It is to be appreciated that the types can be in a hierarchical structure utilizing at least inheritance. In other words, each type is a part of a type hierarchy. The view can be associated with a given type and can project a subset of the respective types of the view associated with its base type. The view can project instances associated to the particular type. For example, for a type "message," only the instances of which message is a parent can be viewed based at least upon the hierarchy structure.

The view component 410 can provide various types of user interfaces to facilitate interaction between a user and any component coupled to type storage system 404. As depicted, the view component 410 is a separate entity that is incorporated into the type storage system 404. However, it is to be appreciated that the view component 410 and/or similar view components can be a separate component from the type storage system 404 and/or a stand-alone unit. The view component 410 can provide one or more graphical user interfaces (GUIs), command line interfaces, and the like. For example, a GUI can be rendered that provides a user with a region or means to load, import, read, etc. data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such vertical and/or horizontal scroll bars for navigation and toolbar buttons to determine whether a region will be viewable can be employed. For example, the user can interact with one or more of the components coupled to the type storage system 404.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the invention is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards)

and/or displays (e.g., black and white, and EGA) with limited graphic support, and/or low bandwidth communication channels.

Figure 5:
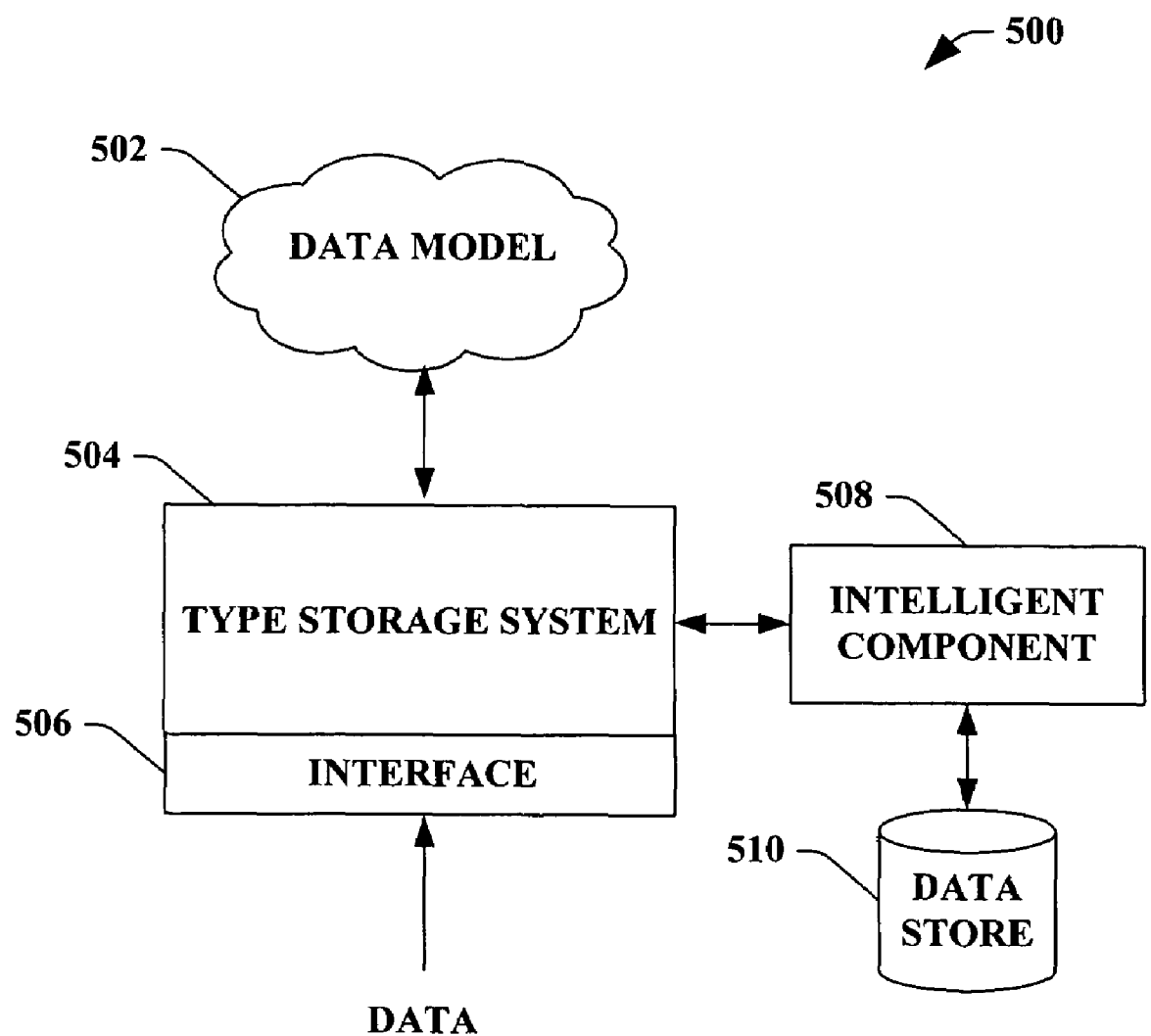
FIG. 5 illustrates a block diagram of an exemplary system that facilitates storing a type instance associated with a data model.

FIG. 5 illustrates a system 500 that employs intelligence to facilitate storing a type instance associated with a data model 502. The system 500 includes a type storage system 504, an interface 506, and the data model 502, which can be substantially similar to the components depicted in earlier figures. The interface 506 can facilitate communication associated to data, which can include a criteria, a type, a schema, a data model, and a query criteria. The system 500 can provide storing a type, querying, and/or providing a view. It is to be appreciated and understood that a database engine can provide a relational storage and a relational query to the system 500.

The system 500 further includes an intelligent component 508. The intelligent component 508 can be utilized by the type storage system 504 to facilitate storing and/or querying for the system 500. For example, the intelligent component 510 can be utilized to facilitate determining a user defined type to be stored. Historic data in conjunction with user profiles can allow the intelligent component 508 to determine storing the type and/or querying with certain criteria.

It is to be understood that the intelligent component 508 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the subject invention.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Furthermore, the intelligent component 508 can utilize a data store 510 to store user profiles and/or historic data. The data store 510 can be, for example, either volatile memory or nonvolatile memory, or can include both volatile and non-volatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 510 of the subject systems and methods is intended to comprise, without being limited to, these and any other suitable types of memory. In addition, it is to be appreciated that the data store 510 can be a server and/or database.

Figure 6:
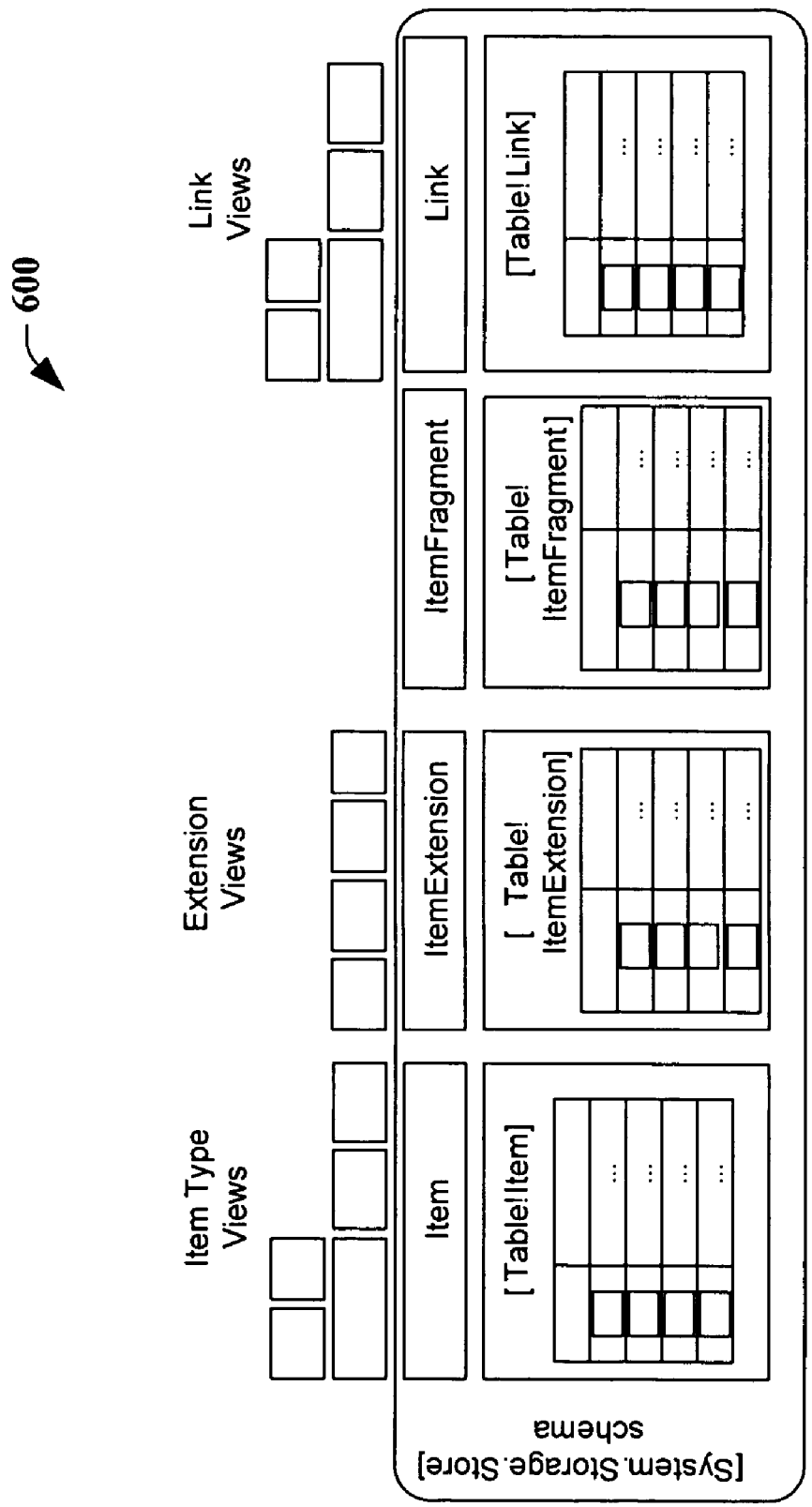
FIG. 6 illustrates a block diagram of a high-level structure of a store within a file storage data model.

FIG. 6 illustrates a high-level structure of a store. A schema can be provided, wherein various instances of types can be stored in tables dependent upon their type. The types can be, but are not limited to, an item, an item extension, an item fragment, and a link. Each type can have a corresponding table that can include columns having object instances therein. For instance, one column in the item table can contain all instances of items in the store. For each row, the column can contain a serialized representation of the CLR class instance that represents the item type instance. It is to be appreciated that for the item extension, item fragment and the link type instances can be represented in a similar structure. Inline type instances can be stored inside a parent object instance rather than storing in separate tables and/or columns. For each item, item extension, item fragment, and link a view can be generated that exposes all the instances of that type. Each type is a part of a type hierarchy. For instance, the item view projects all items in the store.

Figure 7:
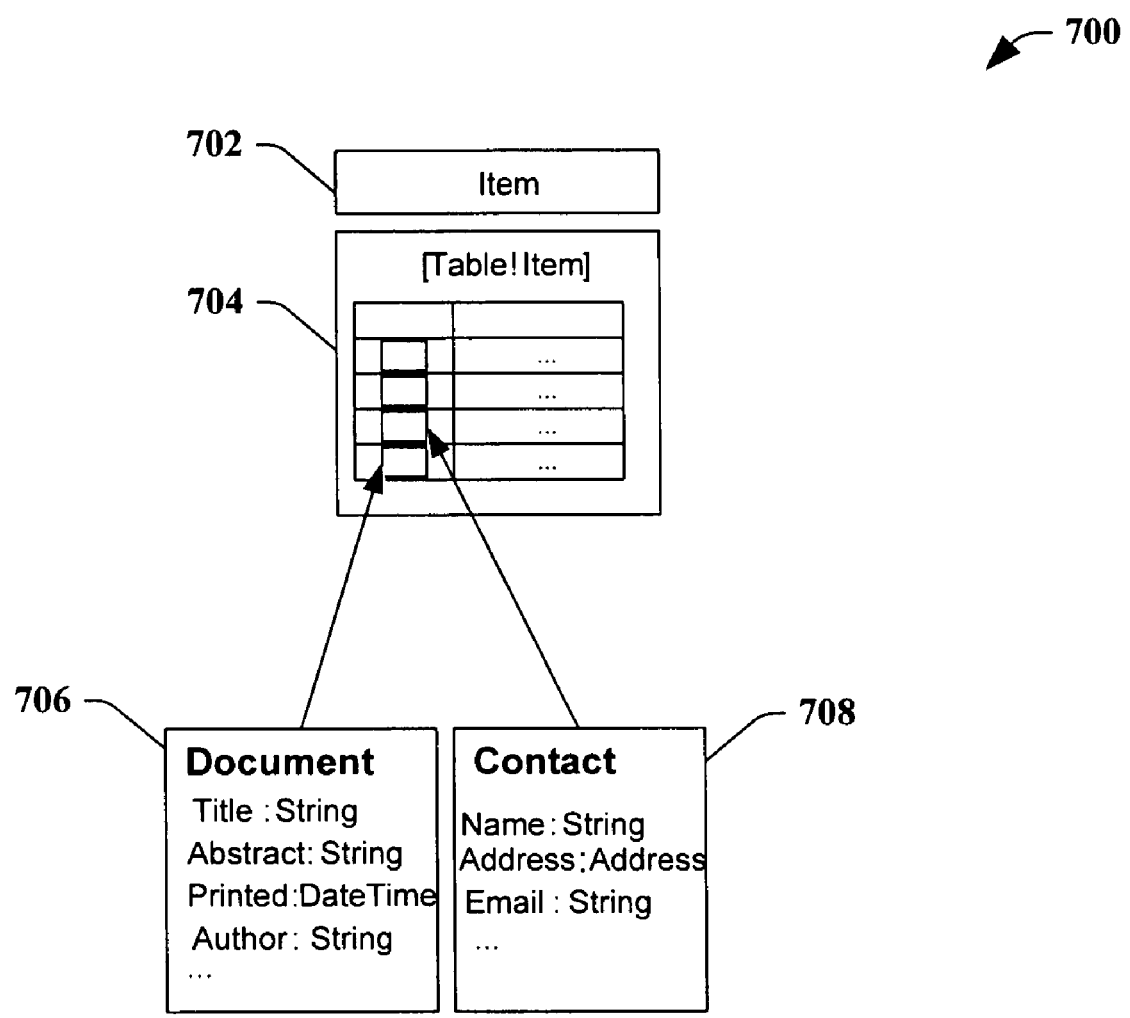
FIG. 7 illustrates a block diagram of a type instance with associated tables.

Briefly turning to FIG. 7, an item 702 is depicted. A table 704 of the item 702 can contain all instances of the items in the store (not shown). The table 704 can contain an object instance 706 ("Document") and an object instance 708 ("Contact"). It is to be appreciated that each type in a schema maps to a CLR class in the storage. The object instance 706 can include a title, an abstract, a printed, an author, and various other metadata associated with the object instance 706. Similarly, the object instance 708 can include various metadata such as name, address, email, etc.

Figure 8:
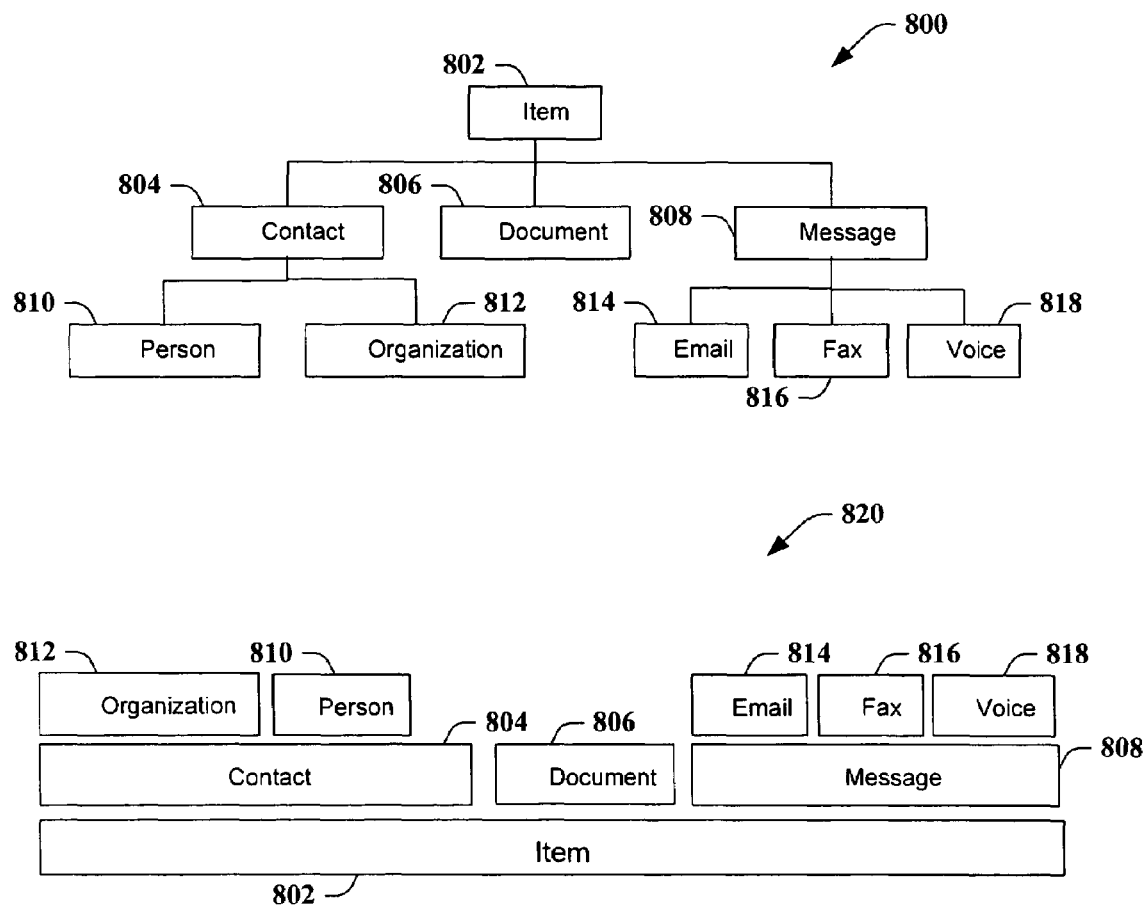
FIG. 8 illustrates block diagram of a type hierarchy and a corresponding view projection.

FIG. 8 illustrates a type hierarchy 800 and a corresponding view projection 820. The type hierarchy 800 can include an item 802, a contact 804, a document 806, a message 808, a person 810, an organization 812, an email 814, a fax 816, and a voice 818. It is to be appreciated that the type hierarchy 800 is an example and any suitable hierarchy and/or types can be utilized in accordance with the subject invention. As illustrated, item 802 is considered a parent of every type included therein. Thus, contact 804 is the parent for person 810 and organization 812, while message 808 is the parent for email 814, fax 816, and voice 818. Furthermore, the corresponding view projection 820 can reflect the type hierarchy 800. The view associated with a given type can project a subset of the items of the view associated with its base type. For example, the item view projects all the items in the store. The contact view projects only the items that are of type Contact. The person view projects only the contacts that have the most derived type as person.

Turning back to FIG. 6, type mapping can be provided utilizing an algorithm for mapping the type to the type used to describe the corresponding storage structure in the store. It is to be appreciated that the mapping can be associated to any file storage system (e.g., a data model based on a system that utilizes complex instances of types to describe and/or represent a unit of information). Each type declared in a schema is mapped to a CLR class that supports the SQL UDT contract. It is to be appreciated that although SQL is utilized in the following examples, any suitable database management system can be employed. The types belong to a namespace whose name corresponds to the namespace of the schema with ".Store" suffix appended. The types in a given namespace are compiled into a single assembly that is utilized as a unit of deployment of the schema. The name of the CLR type is equal to the name declared in the schema. For each declared property of the type, the following is added to the corresponding CLR type: 1) a private field with the name equal to the name specified in the schema, pre-fixed by "m_". The field is attributed with the UDT specific attribute: System.Data.SqlTypes.SqlUdtField; 2) a public property with the name equal to the name specified in the schema and corresponding get/set statements. The property is attributed with the UDT specific attribute System.Data.SqlTypes.SqlUdtProperty; and 3) the type of the field and the property is the CLR type that corresponds to the type declared in the schema. If the type is one of the scalar types that it is mapped to one of the scalar SQL types (discussed infra).

The following table describes the mapping of the file storage system scalar types to the corresponding SQL managed types:

TABLE 1

| File Storage System Type | Managed SQL Type | Description |
| --- | --- | --- |
| String | SqlString | Variable-length Unicode data with a maximum length of length of 2&thsp;31 characters. Length can be fixed from 1-4000 characters or unconstrained using the "max" keyword. |
| Binary | SqlBinary | Variable-length binary data with a maximum length of length of 2&thsp;32 bytes. Length can be fixed from 1-8000 bytes or unconstrained using the "max" keyword. |
| Boolean | SqlBoolean | Null-able Boolean value |
| Byte | SqlByte | A singe unsigned byte |
| Int16 | SqlInt16 | Integer data from −2&thsp;15 (−32,768) through 2&thsp;15 − 1 (32,767). |
| Int32 | SqlInt32 | Integer (whole number) data from −2&thsp;31 (−2,147,483,648) through 2&thsp;31 − 1 (2,147,483,647). |
| Int64 | SqlInt64 | Integer (whole number) data from −2&thsp;63 (−9223372036854775808) through 2&thsp;63 − 1 (9223372036854775807). |
| Single | SqlSingle | Floating precision number data from −3.40E+38 through 3.40E+38 |

TABLE 1-continued

| File Storage System Type | Managed SQL Type | Description |
| --- | --- | --- |
| Double | SqlDouble | Floating precision number data from −1.79E+308 through 1.79E+308 |
| Decimal | SqlDecimal | Numeric data types with fixed precision and scale. Precision and Scale attributes apply for properties of type Decimal. Precision defines the maximum number of decimal digits that decimal value. This includes the digits to the left and to the right of the decimal point. The value of the Precision attribute is an integer between 1 and 28. Scale defines the maximum number of decimal digits to the right of the decimal point. The value of the Scale attribute must be between 0 and the value of the Precision attribute. Note for milestone B: these attributes are not supported in this milestone. Precision is fixed to 28 and Scale is fixed to 14. |
| DateTime | SqlDateTime | Date and time data from Jan. 1, 1753, through Dec. 31, 9999, with an accuracy of three-hundredths of one second or 3.33 milliseconds. |
| Guid | SqlGuid | A globally unique identifier (GUID). |
| Xml | SqlString | XML is currently stored as a string field. Native Xml type support is being considered for post-Beta1. |
| Stream | TBD | Support planned for post-Beta1. If supported it may replace string(max) and binary(max) declarations. |

A database object created in a file storage system store can be stored in a SQL schema name derived from the file storage system schema name. The suffix ".Store" is appended to the file storage system schema name to produce the SQL schema name. For example, the file storage system.storage schema produces objects in the "[System.Storage.Store]" SQL schema such as "[System.Storage.Store].Item."

Content in the file storage system can be accessed through views. The views depicted below are read-only, but the subject invention is not so limited since the views can be write-enabled. Each item type can be mapped to a typed view. Each typed item view can be identified in a file storage system store using the naming convention [<schema name>.Store].[<Item type name>]. A type view for type T can return all items that are type T and all types that derive from T. The view that corresponds to the System.Storage.Item type is [System.Storage.Store].[Item]. This view can return all the items in a file storage system store. The following table describes the columns of an item type view:

TABLE 2

| Column name | Type | Description |
| --- | --- | --- |
| ItemId | [System.Storage.Store].ItemId | ItemId of the item |
| TypeId | [System.Storage.Store].TypeId | Schematized type id |
| NamespaceName | nvarchar(255) | The unique name of the item |
| ContainerId | [System.Storage.Store].ItemId | The id of the container item |
| Item | Item type | Instance of the item type |
| EntityState | [System.Storage.Store].EntityState | The state information for the item |
| ObjectSize | Bigint | Size of the item object (persisted column) |
| ChangeInformation | [System.Storage.Store].ChangeInformation | Change tracking information |
| ItemSyncMetadata | [System.Storage.Store].ItemSyncMetadata | Sync metadata |
| PathHandle | [System.Storage.Store].BinPathHandle | The handle of the path to the item |
| PromotionStatus | Int | The status of the promotion for the item |

Each link type is mapped to a typed view. Each typed link view is identified in a file storage system store using the naming convention [<schema name>.Store].[<link type name>]. The view that corresponds to the System.Storage.Link type is [System.Storage.Store].[Link]. This view can contain all the links in a file storage system store. The following table describes the columns of a link type view:

TABLE 3

| Column name | Type | Description |
| --- | --- | --- |
| SourceRef | [System.Storage.Store].ItemId | ItemId of the source item |
| LinkId | [System.Storage.Store].LinkId | Id of the link |
| TargetRef | [System.Storage.Store].ItemId | ItemId of the target item |
| TypeId | [System.Storage.Store].TypeId | TypeId of the most derived type of the link instance |
| Link | Link type | Instance of the link type |
| EntityState | [System.Storage.Store].EntityState | The state information for the link |
| ObjectSize | Bigint | Size of the link object (persisted column) |
| ChangeInformation | [System.Storage.Store].ChangeInformation | Change tracking information |
| LinkSyncMetadata | [System.Storage.Store].ItemSyncMetadata | Sync metadata |
| PathHandle | [System.Storage.Store].BinPathHandle | The handle of the path to the item that is the source of the link |

All item fragments can be accessible through single view [System.Storage.Store].[ItemFragment]. The following table describes the columns of global item fragment view:

TABLE 4

| Column name | Type | Description |
| --- | --- | --- |
| ItemId | [System.Storage.Store].ItemId | ItemId of the owning item |
| SetId | [System.Storage.Store].SetId | The usage of the item fragment |
| FragmentId | [System.Storage.Store].FragmentId | The Id of the fragment instance |
| TypeId | [System.Storage.Store].TypeId | TypeId of the most derived type of the ItemFragment instance |
| ItemFragment | [System.Storage.Store].[ItemFragment] | Instance of the ItemFragment type |
| EntityState | [System.Storage.Store].EntityState | The state information for the link |
| ChangeInformation | [System.Storage.Store].ChangeInformation | Change tracking information |
| PathHandle | [System.Storage.Store].BinPathHandle | The handle of the path to the item that is the source of the link |

Each store provides a global extension view named [System.Storage.Store].[ItemExtension]. Instances of all extension types are accessible through this view. The following table describes the columns in the global extension view:

TABLE 5

| Column name | Type | Description |
| --- | --- | --- |
| ItemId | [System.Storage.Store].ItemId | ItemId of the extension |
| TypeId | [System.Storage.Store].TypeId | Schematized type id |
| ItemExtension | [System.Storage.Store].ItemExtension | Extension type instance |
| EntityState | [System.Storage.Store].EntityState | The state information for the extension |
| ObjectSize | Bigint | Size of the extension object (persisted column) |
| ChangeInformation | [System.Storage.Store].ChangeInformation | Change tracking information |
| PathHandle | [System.Storage.Store].BinPathHandle | The handle of the path to the item that owns the extension |

Each extension type is mapped to a typed view. Each typed extension view is identified in a file storage system store using the naming convention [<schema name>.Store].[<extension type name>]. The following table describes the columns of an extension type view:

TABLE 6

| Column name | Type | Description |
| --- | --- | --- |
| ItemId | [System.Storage.Store].ItemId | ItemId of the extension |
| TypeId | [System.Storage.Store].TypeId | Schematized type id |
| ItemExtension | Extension type | Extension type instance |
| ObjectSize | Bigint | Size of the extension object (persisted column) |
| EntityState | [System.Storage.Store].EntityState | The state information for the extension |
| ChangeInformation | [System.Storage.Store].ChangeInformation | Change tracking information |
| PathHandle | [System.Storage.Store].BinPathHandle | The handle of the path to the item that owns the extension |

In the file storage system, an inline type instance can be stored within entity type instances. It is to be appreciated and understood that they are accessed by querying the appropriate search view.

All Items are stored in a single item table, called [System.Storage.Store].[Table!Item]. The unique key in the following table is ItemId:

TABLE 7

| Column name | Type | Description |
| --- | --- | --- |
| ItemId | [System.Storage.Store].ItemId | ItemId of the item |
| TypeId | [System.Storage.Store].TypeId | Schematized type id |
| NamespaceName | Nvarchar(255) | The unique name of the item |
| ContainerId | [System.Storage.Store].ItemId | The id of the container item |
| Item | Item type | The item |
| EntityState | [System.Storage.Store].EntityState | EntityState udt which contains meta information about the item. |
| SDId | Int | Internal use only (used by security sub-system) |
| SDLastUpdateLocalTS | Bigint | The timestamp of the last change of the SDId. Used for change tracking. |
| ChangeInformation | [System.Storage.Store].ChangeInformation | Change tracking information |
| ItemSyncMetadata | [System.Storage.Store].ItemSyncMetadata | Sync metadata for global Ids |
| TombstoneStatus | Int | Tombstone status |
| LastUpdateLocalTS | Bigint | Internal use only (used for indexing). This column is actually mapped to ChangeInformation.LastUpdateLocalTS. We need to map it in order to create an index on it. |
| MaxOrd | int | Internal use only (used to compute PathHandle for new items added to this container item) |
| TypePath | Hierarchical_Type_Id | Internal use only (persisted column) |
| ObjectSize | Bigint | Size of the item object (persisted column) |
| PathHandle | [System.Storage.Store].BinPathHandle | The path handle to this item |
| PromotionStatus | Int | The promotion status for the item |
| LastAccessTime | DateTime | The last access time for the file stream associated with the item. |
| StreamSize | Bigint | The size of the stream associated with the item |
| AllocationSize | Bigint | The allocated size for the stream associated with the item |

The indexes on the item table are described in the following table:

TABLE 8

| Columns | Unique | Clustered | Included Columns |
|---|---|---|---|
| TypePath, ItemId | Yes | Yes | |
| ItemId | Yes | No | TombstoneStatus, TypePath, SDId |
| PathHandle | Yes | No | SDId, TombstoneStatus |

TABLE 8-continued

| Columns | Unique | Clustered | Included Columns |
|---|---|---|---|
| ContainerId, NamespaceName | Yes | No | SDId, TombstoneStatus |
| LastUpdateLocalTS | No | No | SDId, TombstoneStatus, PathHandle |

All links will be stored in the link table, which is named [System.Storage.Store].[Table!Link]. The unique key in the following table is ItemId, LinkId:

TABLE 9

| Column name | Type | Description |
|---|---|---|
| SourceRef | [System.Storage.Store].ItemId | ItemId of the source item |
| LinkId | [System.Storage.Store].LinkId | Id of the link |
| TargetRef | [System.Storage.Store].ItemId | ItemId of the target item |
| TypeId | [System.Storage.Store].TypeId | Schematized type id |
| TypePath | Hierarchical_Type_Id | Internal use only (persisted column) |
| Link | Link type | The link object |
| EntityState | [System.Storage.Store].EntityState | State information about the link |
| SDId | Int | Internal use only |
| TombstoneStatus | Int | Tombstone status |
| ObjectSize | Bigint | Size of the link object (persisted column) |
| ChangeInformation | [System.Storage.Store].ChangeInformation | Change tracking information |
| LinkSyncMetadata | [System.Storage.Store].LinkSyncMetadata | Sync metadata |
| LastUpdateLocalTS | Bigint | Internal use only (used for indexing). This column is actually mapped to ChangeInformation.LastUpdateLocalTS. We need to map it in order to create an index on it. |
| PathHandle | [System.Storage.Store].BinPathHandle | The path handle to the item that is the source of the link |

The indexes on the Link table are described in the following table:

TABLE 10

| Columns | Unique | Clustered | Included Columns |
|---|---|---|---|
| SourceRef, LinkId | Yes | Yes | |
| TypePath | No | No | SDId, TombstoneStatus |
| SourceRef, TypePath | No | No | SDId, TombstoneStatus |
| PathHandle | No | No | SDId, TombstoneStatus |
| TargetRef | No | No | SDId, TombstoneStatus |
| LastUpdateLocalTS | No | No | SDId, TombstoneStatus, PathHandle |

All EntityExtensions are stored in a single table called: [System.Storage.Store].[Table!ItemExtension]. The following table describes item extension table:

TABLE 11

| Column name | Type | Description |
|---|---|---|
| ItemId | [System.Storage.Store].ItemId | ItemId of the extension |
| TypeId | [System.Storage.Store].TypeId | Schematized type id |
| TypePath | Hierarchical_Type_Id | Internal use only (persisted column) |
| ItemExtension | [System.Storage.Store].ItemExtension | The ItemExtension object |
| EntityState | [System.Storage.Store].EntityState | EntityState udt which contains meta information about the EntityExtension. |
| SDId | Int | Internal use only |
| TombstoneStatus | Int | Tombstone status |
| ObjectSize | Bigint | Size of the EntityExtension object (persisted column) |
| ChangeInformation | [System.Storage.Store].ChangeInformation | Change tracking information |
| LastUpdateLocalTS | Bigint | Internal use only (used for indexing). This column is actually mapped to ChangeInformation.LastUpdateLocalTS. We need to map it in order to create an index on it. |
| PathHandle | [System.Storage.Store].BinPathHandle | The path handle to the item owning this EntityExtension |

The indexes on the ItemExtension table are described in the following table:

TABLE 12

| Columns | Unique | Clustered | Included Columns |
|---|---|---|---|
| TypePath, ItemId, TypeId | Yes | Yes | |
| ItemId, TypeId | No | No | SDId, TombstoneStatus, PathHandle |
| PathHandle | Yes | No | SDId, TombstoneStatus |
| LastUpdateLocalTS | No | No | SDId, TombstoneStatus, PathHandle |

All ItemFragment type instances are stored in a single table named [System.Storage.Store].[Table!ItemFragment]. The following table depicts the ItemFragment type:

TABLE 13

| Column name | Type | Description |
|---|---|---|
| ItemId | [System.Storage.Store].ItemId | ItemId of the owning item |
| SetId | [System.Storage.Store].SetId | The usage of the item fragment |
| FragmentId | [System.Storage.Store].FragmentId | The Id of the fragment instance |
| ItemFragment | [System.Storage.Store].ItemFragment | The ItemFragment object |
| TypeId | [System.Storage.Store].TypeId | Schematized type id |
| TypePath | Hierarchical_Type_Id | Internal use only (persisted column) |
| EntityState | [System.Storage.Store].EntityState | EntityState udt which contains meta information about the fragment. |
| SDId | int | Internal use only |
| TombstoneStatus | int | Tombstone status |
| ObjectSize | bigint | Size of the ItemFragment object (persisted column) |
| ChangeInformation | [System.Storage.Store].ChangeInformation | Change tracking information |
| LastUpdateLocalTS | bigint | Internal use only (used for indexing). This column is actually mapped to ChangeInformation. LastUpdateLocalTS. We need to map it in order to create an index on it. |
| PathHandle | [System.Storage.Store].BinPathHandle | The path handle to the owning item |

The indexes on the ItemFragment table are described in the following table:

TABLE 14

| Column name | Unique | Clustered | Included Columns |
|---|---|---|---|
| TypePath, ItemId, SetId, FragmentId | Yes | Yes | |
| ItemId, SetId, FragmentId | Yes | No | SDId, TombstoneStatus, PathHandle |
| PathHandle | Yes | No | SDId, TombstoneStatus |
| LastUpdateLocalTS | No | No | SDId, TombstoneStatus, PathHandle |

Figure 9:
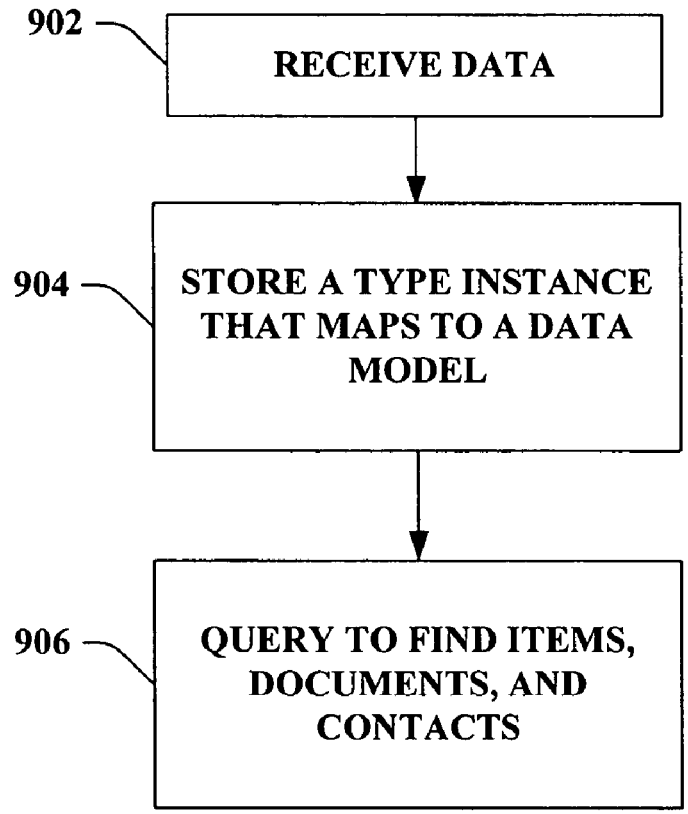
FIG. 9 illustrates an exemplary methodology for storing a type instance that maps to a data model and/or providing a query.
Figure 10:
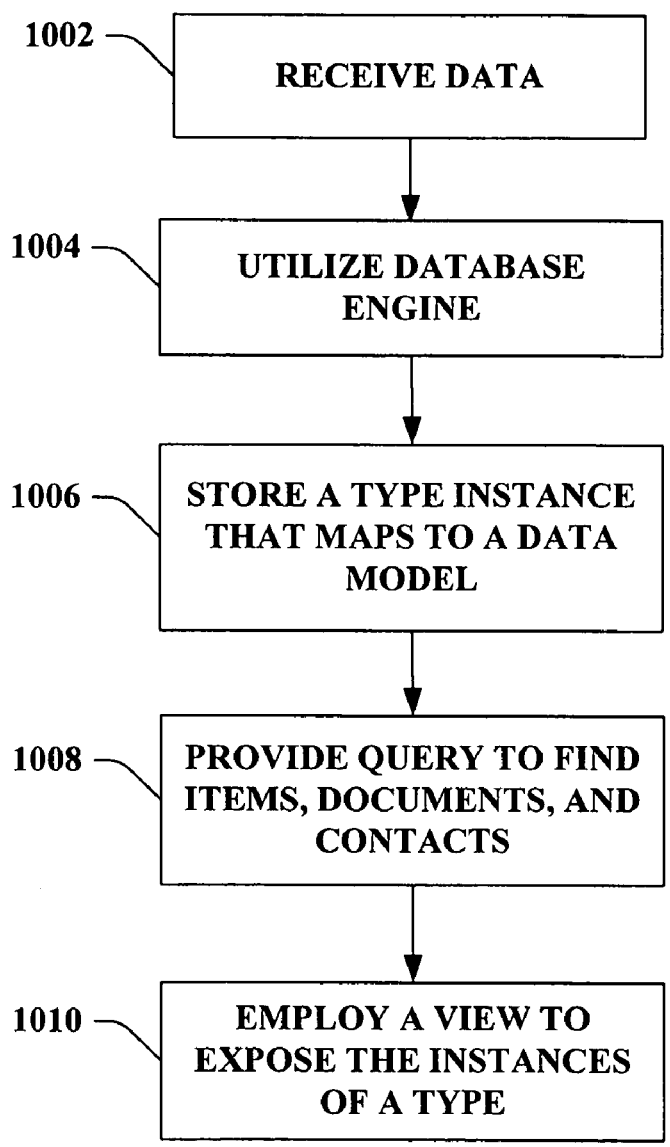
FIG. 10 illustrates an exemplary methodology for storing a type instance that maps to a data model and/or providing a query.

FIGS. 9-10 illustrate methodologies in accordance with the subject invention. For simplicity of explanation, the methodologies are depicted and described as a series of acts. It is to be understood and appreciated that the subject invention is not limited by the acts illustrated and/or by the order of acts, for example acts can occur in various orders and/or concurrently, and with other acts not presented and described herein. Furthermore, not all illustrated acts may be required to implement the methodologies in accordance with the subject invention. In addition, those skilled in the art will understand and appreciate that the methodologies could alternatively be represented as a series of interrelated states via a state diagram or events.

FIG. 9 illustrates a methodology 900 that facilitates storing a type instance that maps to a data model and/or provides a query. The data model can be a file storage data model that enables storing, finding, and relating information. An information type can be, but is not limited to, a document, an image, a video, a contact, a message, an email, an audio clip, etc. These informational types (e.g., units of information) can be represented as instances of complex types that are part of a type system that supports inheritance, wherein inheritance allows objects to inherit attributes and/or behaviors from other objects. It is to be appreciated that inheritance can be considered a hierarchical structure and/or format.

At reference numeral 902, data can be received, wherein the data can include a type, a criteria, a schema, a query criteria, . . . . The type instance can be stored to map to a data model (e.g., a file storage data model) at reference numeral 904. For instance, the model can map types described in the schema to user defined types and database objects. The storage mapping can describe the database objects that are created based on a schema definition and how instances of types described in the schema are stored and/or accessed. In one example, a database structure can be designed such that the instances of types and the rules for mapping of type declarations into database objects can be provided.

At reference numeral 906, a query can be invoked to satisfy at least one criterion to efficiently and effectively find items, documents, and contacts. For instance, storing the type instance that relates to information types can utilize the query to provide at least one of the following: 1) find at least one item in the file storage data model 102 that satisfy a certain criteria; 2) find at least one document in the file storage data model 102 that satisfy a particular criteria; and 3) find at least one contact (e.g., including an individual, organization, and group) that satisfy a certain criteria.

FIG. 10 illustrates a methodology 1000 that facilitates storing a type instance and/or providing a query. At reference numeral 1002, data is obtained and/or received. The data can include a type, a criteria, a schema, a query criteria, etc. At 1004, a database engine can be utilized to provide at least one mechanism for storing the type instances and/or for querying. For instance, a relational database engine can be utilized to provide a relational storage and a relation query capability. The relational database engine can utilize a collection of data items organized as a set of formally described tables. The data within the tables can be accessed and/or reassembled in various ways without the requirement of reorganizing the database tables. Furthermore, the relational database can be easily extended, such as adding new categories without modifications to existing applications and/or data.

At reference numeral 1006, a type instance is stored that maps to a data model, wherein the data model can be a file storage system. The storage mapping describes the database objects that are created based on the schema and how instances of types described in the schema are stored and/or accessed. The mapping can be of types described in the schema, wherein such mapping is to user defined types and database objects. At reference numeral 1008, a query can be provided to find at least one of an item, a document, and a contact. The query can be utilized to search based at least in part upon a criterion. Moreover, at reference numeral 1010, a view can be employed to expose the instances of the type. For instance, the type system can be hierarchical in structure, wherein a view can be generated to expose any instance of the particular type. In other words, because of the hierarchy, the view is associated with a given type that projects a subset of the particular types of the view associated with its base type.

Figure 11:
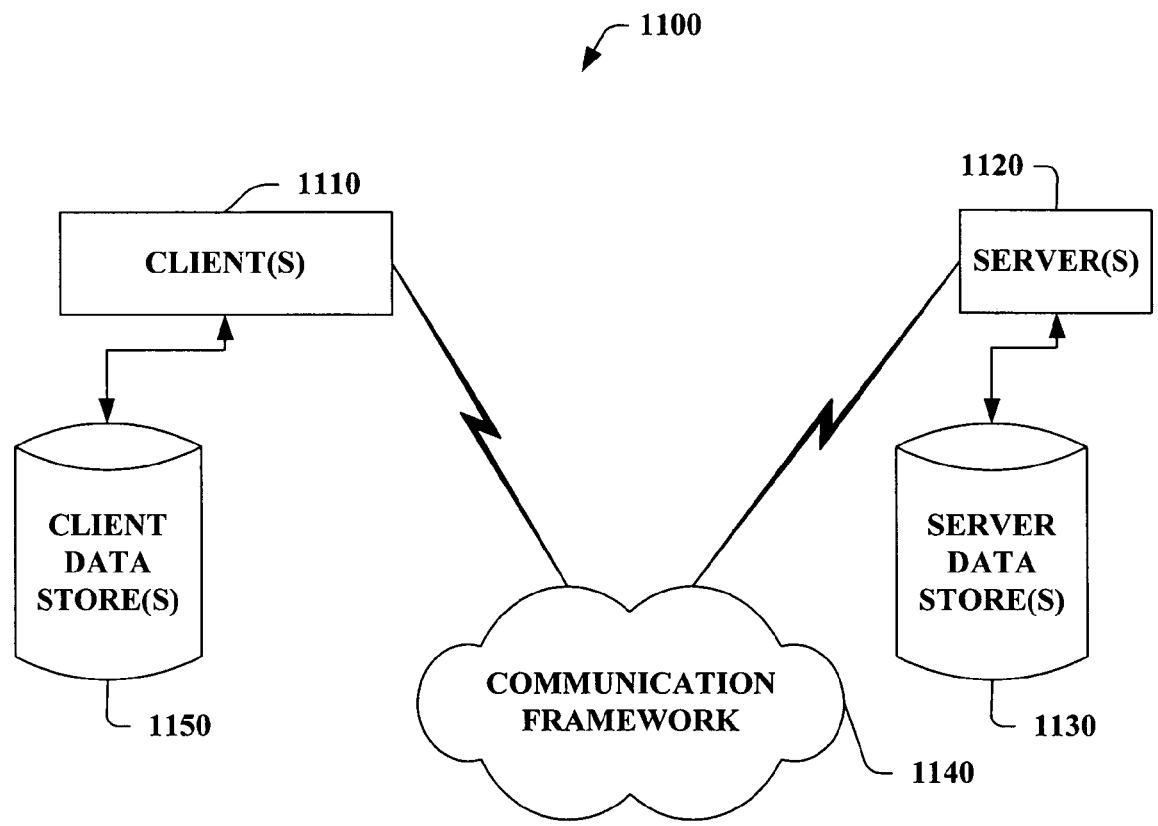
FIG. 11 illustrates an exemplary networking environment, wherein the novel aspects of the subject invention can be employed.
Figure 12:
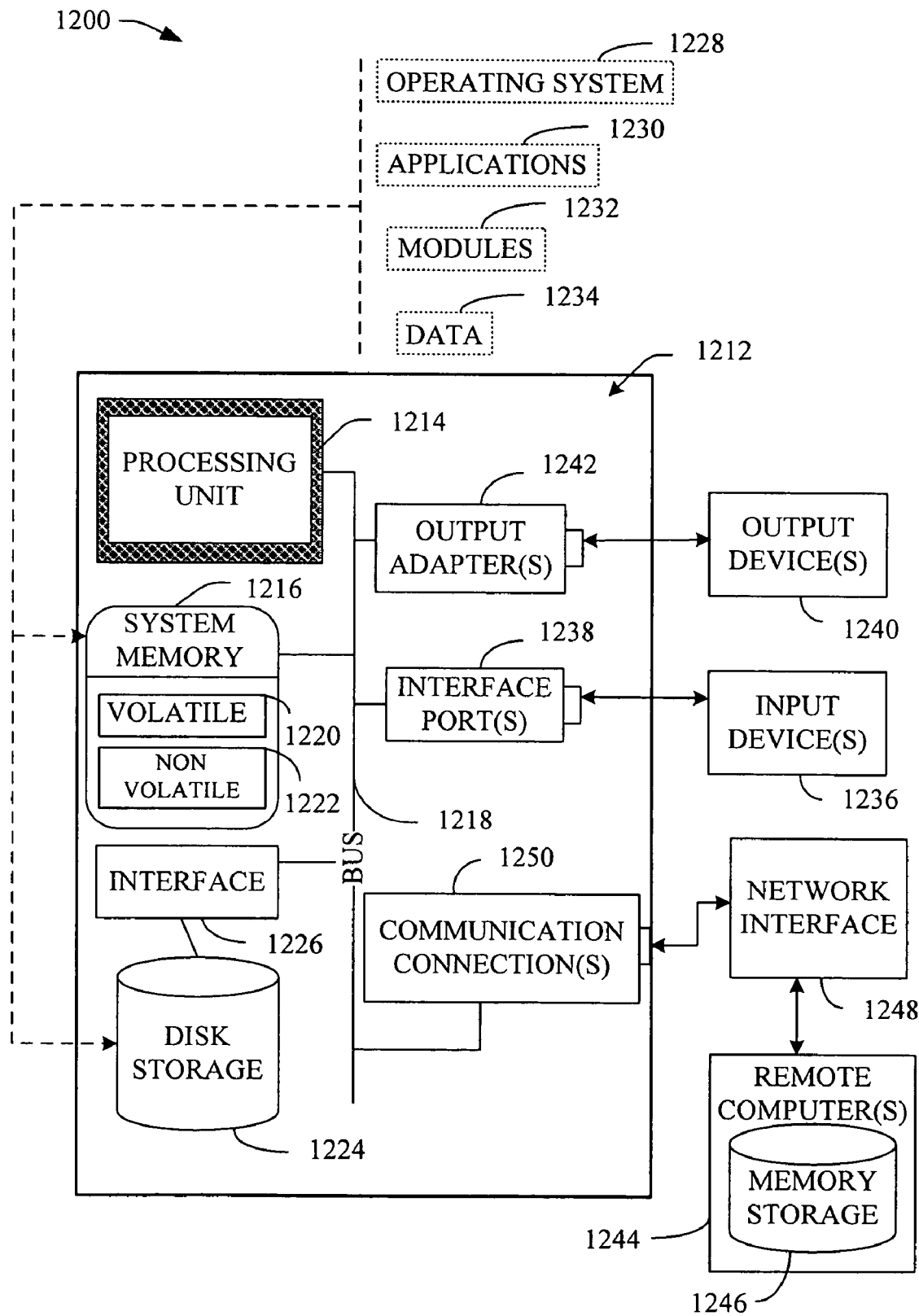
FIG. 12 illustrates an exemplary operating environment that can be employed in accordance with the subject invention.

In order to provide additional context for implementing various aspects of the subject invention, FIGS. 11-12 and the following discussion is intended to provide a brief, general description of a suitable computing environment in which the various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 11 is a schematic block diagram of a sample-computing environment 1100 with which the subject invention can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject invention, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1140.

With reference to FIG. 12, an exemplary environment 1200 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multi-processor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the subject invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates mapping a data model, the system is recorded on a computer-readable medium and capable of execution by a computer, comprising:

a file storage data model that is utilized to define a mapping schema and that enables storing, finding, and relating information;

a type storage component that maps a schema object to a database object based on the associated mapping schema, wherein an instance of a type in the mapping schema is stored, and wherein the type storage component further provides a query to find at least one of the following: at least one item in the system that satisfies a respective criteria; at least one document in the system that satisfies a respective criteria; and at least one contact that satisfies a respective criteria, where the contact includes at least one of the following: an individual; an organization; and a group;

wherein the type in the schema maps to a common language runtime (CLR) class in a storage of the file storage data model, and the type is at least one of the following: an item; an item extension; an item fragment; and a link;

a table that has at least one of the following: 1) a column that contains at least one instance of the respective type; and 2) a row that contains a serialized representation of the CLR class instance that represents the type instance; wherein the item extension, item fragment and the link type instances are represented in a similar table structure and inline type instances are stored inside a parent object instance rather than storing in separate tables and columns; and an intelligent component that determines a user defined type to be stored via inferring a specific context or action of a user and generating a probability distribution over states of interest based on a consideration of data and events.

2. The system of claim 1, the instance of the type is at least one of: a document; an image; music; a video; a contact; a message; a person; an organization; an email; a fax; a voice; and an audio clip.

3. The system of claim 1, further comprising a relational component that utilizes at least one of a relational storage and a relational query capability.

4. The system of claim 3, the relational component utilizes a relational database technique that is a collection of data items organized as a set of formally described tables, wherein data can be at least one of accessed without reorganization and reassembled without reorganization.

5. The system of claim 1, the mapping describes at least one of the database objects created based on the schema and how the instance of the type described in the schema is stored and accessed.

6. The system of claim 1, further comprising a view component that generates a view that exposes at least one instance of the type, wherein the view projects a subset of the respective type of the view associated with a base type.

7. The system of claim 1, the type contains at least one of the following a type hierarchy and an inheritance.

8. A computer-implemented method that facilitates mapping a data model, comprising:
   obtaining a file storage data model that is utilized to define a mapping schema and that enables storing, finding, and relating information;
   receiving at least one of a schema, a type, a criteria, and a query information;
   mapping a schema object to a database object based on the schema associated to the file storage data model;
   storing an instance of the type from the schema; mapping the type in the schema to a common language runtime (CLR) class in a storage of the file storage data model, wherein the type is at least one of the following: an item; an item extension; an item fragment; and a link; and
   wherein the type storage component further provides a query to find at least one of the following: at least one item in the system that satisfies a respective criteria; at least one document in the system that satisfies a respective criteria; and at least one contact that satisfies a respective criteria, where the contact includes at least one of the following: an individual; an organization; and a group;
   providing a table that has at least one of the following: 1) a column that contains at least one instance of the respective type; and 2) a row that contains a serialized representation of the CLR class instance that represents the type instance; wherein the item extension, item fragment and the link type instances are represented in a similar table structure and inline type instances are stored inside a parent object instance rather than storing in separate tables and columns;
   and providing an intelligent component that determines a user defined type to be stored via inferring a specific context or action of a user and generating a probability distribution over states of interest based on a consideration of data and events.

9. The method of claim 8, further comprising querying to find at least one of the following: at least one item in the system that satisfies a respective criteria; at least one document in the system that satisfies a respective criteria; and at least one contact that satisfies a respective criteria.

10. The method of claim 8, further comprising utilizing a relational database engine to provide a relational storage and a relational query capability.

11. The method of claim 8, further comprising generating a view that exposes at least one instance of the type, wherein the view projects a subset of the respective type of the view associated with a base type.

12. A data packet that communicates between a file storage data model and a type storage component, the data packet facilitates the method of claim 8.

13. A system that facilitates mapping a data model, the system is recorded on a computer-readable medium and capable of execution by a computer, comprising:
   means for receiving at least one of the following a schema, a type, a criteria, and a query criteria;
   means for defining a mapping schema that enables storing, finding, and relating information utilizing a file storage data model;
   means for mapping a schema object to a database object based on a schema associated to a file storage data model, wherein an instance of a type in the schema is stored, and wherein the type storage component further provides a query to find at least one of the following: at least one item in the system that satisfies a respective criteria; at least one document in the system that satisfies a respective criteria; and at least one contact that satisfies a respective criteria, where the contact includes at least one of the following: an individual; an organization; and a group;
   means for mapping the type in the schema to a common language runtime (CLR) class in a storage of the file storage data model, wherein the type is at least one of the following: an item; an item extension; an item fragment; and a link; and
   means for providing a table that has at least one of the following: 1) a column that contains at least one instance of the respective type; and 2) a row that contains a serialized representation of the CLR class instance that represents the type instance; wherein the item extension, item fragment and the link type instances are represented in a similar table structure and inline type instances are stored inside a parent object instance rather than storing in separate tables and columns; and
   means for providing an intelligent component that determines a user defined type to be stored via inferring a specific context or action of a user and generating a probability distribution over states of interest based on a consideration of data and events.

14. The system of claim 6, the view component invokes a user interface to interact between a user and the type storage component.

* * * * *